United States Patent
Guo et al.

(10) Patent No.: US 11,830,064 B2
(45) Date of Patent: Nov. 28, 2023

(54) METHOD AND SYSTEM FOR CREDIT RISK IDENTIFICATION

(71) Applicant: Beijing Trusfort Technology Co., Ltd., Beijing (CN)

(72) Inventors: Hao Guo, Beijing (CN); Wengang Wang, Beijing (CN); Zhun Cai, Beijing (CN); Yue Sun, Beijing (CN); Xiaopeng Guo, Beijing (CN)

(73) Assignee: Beijing Trusfort Technology Co., Ltd., Beijing (CN)

( * ) Notice: Subject to any disclaimer, the term of this patent is extended or adjusted under 35 U.S.C. 154(b) by 21 days.

(21) Appl. No.: 17/139,129

(22) Filed: Dec. 31, 2020

(65) Prior Publication Data

US 2022/0207604 A1 Jun. 30, 2022

(51) Int. Cl.
*G06Q 40/03* (2023.01)
*G06Q 10/067* (2023.01)

(52) U.S. Cl.
CPC ........... *G06Q 40/03* (2023.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 6,363,164 B1 * | 3/2002 | Jones | ................... | G06V 30/127 209/534 |
| 7,181,427 B1 * | 2/2007 | DeFrancesco | ......... | G06Q 20/10 705/37 |
| 7,249,074 B1 * | 7/2007 | Land | ...................... | G06Q 40/02 705/34 |
| 7,921,046 B2 * | 4/2011 | Parsons | .................. | G06Q 40/06 705/35 |
| 8,566,198 B1 * | 10/2013 | Price | ...................... | G06Q 40/02 705/38 |
| 8,781,954 B2 * | 7/2014 | Haggerty | ............... | G06Q 40/02 707/800 |
| 9,529,851 B1 * | 12/2016 | Smith | .................. | G06F 21/6218 |
| 9,824,394 B1 * | 11/2017 | Boates | ................. | G06Q 20/405 |
| 9,830,646 B1 * | 11/2017 | Wasser | .................. | G06F 3/0412 |
| 9,916,621 B1 * | 3/2018 | Wasser | .................. | G06T 11/001 |
| 10,366,342 B2 * | 7/2019 | Zhao | ...................... | G06N 20/00 |
| 10,366,450 B1 * | 7/2019 | Mahacek | ............... | G06Q 40/00 |
| 10,373,222 B1 * | 8/2019 | Sahni | ................. | G06Q 30/0609 |
| 10,417,613 B1 * | 9/2019 | Brisebois | .............. | G06F 21/554 |

(Continued)

OTHER PUBLICATIONS

Feng, B., Xu, H., Xue, W., & Xue, B. (2020). Every Corporation Owns Its Structure: Corporate Credit Ratings via Graph Neural Networks. ArXiv, abs/2012.01933. (Credit Rating) (Year: 2020).*

(Continued)

*Primary Examiner* — Chikaodinaka Ojiaku
(74) *Attorney, Agent, or Firm* — Maier & Maier, PLLC

(57) ABSTRACT

A method and system for credit risk identification. The disclosed embodiments include receiving a loan request to a credit business system from a user; in response to the loan request, obtaining operation data by the user on the credit business system within a period of time before the loan request; performing risk identification on the user using a neuronal network according to the loan request and the operation data to generate a result, and determining a response to the loan request based on the result of the risk identification.

14 Claims, 4 Drawing Sheets

(56) References Cited

U.S. PATENT DOCUMENTS

| | | | | |
|---|---|---|---|---|
| 10,417,704 B2* | 9/2019 | Searson | G06N 20/00 | |
| 10,445,826 B1* | 10/2019 | Poursartip | G06F 18/214 | |
| 10,453,142 B2* | 10/2019 | Mun | G06Q 40/08 | |
| 10,467,695 B1* | 11/2019 | Zitzewitz | G06Q 40/04 | |
| 10,521,813 B2* | 12/2019 | Okerlund | G06Q 20/384 | |
| 10,643,276 B1* | 5/2020 | Loddo | G06Q 40/03 | |
| 10,853,900 B2* | 12/2020 | Hua | G16H 10/60 | |
| 10,885,521 B2* | 1/2021 | Miller | G06Q 50/22 | |
| 2002/0001393 A1* | 1/2002 | Jones | G06V 10/96 | 382/100 |
| 2004/0138997 A1* | 7/2004 | DeFrancesco | G06Q 40/03 | 705/38 |
| 2005/0010506 A1* | 1/2005 | Bachann | G06Q 40/03 | 705/35 |
| 2005/0207634 A1* | 9/2005 | Jones | G07D 11/30 | 382/135 |
| 2005/0216316 A1* | 9/2005 | Brisbois | G06Q 40/02 | 705/4 |
| 2006/0074793 A1* | 4/2006 | Hibbert | G06Q 40/00 | 705/38 |
| 2007/0011083 A1* | 1/2007 | Bird | G06Q 30/08 | 705/38 |
| 2007/0174191 A1* | 7/2007 | Keaton | G06Q 40/04 | 705/40 |
| 2007/0239581 A1* | 10/2007 | Eder | G06Q 40/06 | 705/36 R |
| 2009/0106141 A1* | 4/2009 | Becker | G06Q 40/08 | 705/38 |
| 2011/0106690 A1* | 5/2011 | Fisher | G06Q 40/03 | 705/38 |
| 2011/0218905 A1* | 9/2011 | Zeringue | G06Q 20/24 | 705/38 |
| 2016/0364678 A1* | 12/2016 | Cao | G06Q 10/083 | |
| 2016/0364679 A1* | 12/2016 | Cao | G06Q 50/30 | |
| 2016/0364812 A1* | 12/2016 | Cao | G06Q 50/30 | |
| 2016/0364823 A1* | 12/2016 | Cao | G01C 21/3438 | |
| 2016/0371617 A1* | 12/2016 | Mullaney | G06Q 10/0635 | |
| 2016/0371792 A1* | 12/2016 | Luo | G06Q 50/01 | |
| 2016/0379248 A1* | 12/2016 | Panaguiton Damian | G06Q 30/0633 | 705/14.51 |
| 2017/0011466 A1* | 1/2017 | Murikipudi | G06Q 40/08 | |
| 2017/0061548 A1* | 3/2017 | Roebuck | G06Q 40/123 | |
| 2017/0213280 A1* | 7/2017 | Kaznady | G06N 20/00 | |

OTHER PUBLICATIONS

F. S. Park, C. Gangakhedkar and P. Traynor, "Leveraging Cellular Infrastructure to Improve Fraud Prevention," 2009 Annual Computer Security Applications Conference, 2009, pp. 350-359, doi: 10.1109/ACSAC.2009.40. (Leveraging Cellular Infrastructure . . . ) (Year: 2009).*

Aniceto MC, Barboza F, Kimura H. Machine learning predictivity applied to consumer creditworthiness. Future Business Journal. 2020;6(1):37. doi:10.1186/s43093-020-00041-w (Creditworthiness) (Year: 2020).*

R. A. Leite et al., "EVA: Visual Analytics to Identify Fraudulent Events," in IEEE Transactions on Visualization and Computer Graphics, vol. 24, No. 1, pp. 330-339, Jan. 2018, doi: (EVA) (Year: 2018).*

* cited by examiner

METHOD AND SYSTEM FOR CREDIT RISK IDENTIFICATION

BACKGROUND

In recent years, with the rise of business forms such as mutual finance and consumer finance, the scope of personal financial credit business has gradually expanded to new scenarios and new customer groups. New models and channels have been explored, gradually shifting from offline channels to online channels. At the same time, risk control as the "essence" of finance is facing unprecedented challenges. The rapid expansion of business volume requires the credit business system to provide faster and more efficient services to further attract customers. But it will cause great economic losses if the risk control is not handled properly. Quickly and accurately identifying the risks at the credit application stage has become a very critical issue.

SUMMARY

A need exists for improved process of identifying credit risk of user for determining whether to issue a loan to the user. Embodiments disclosed herein provide a method for credit risk identification comprising: receiving a loan request to a credit business system from a user, in response to the loan request, obtaining operation data by the user on the credit business system within a period of time before the loan request, performing risk identification on the user using a neuronal network according to the loan request and the operation data to generate a result, and determining a response to the loan request based on the result of the risk identification. In some embodiments, the operation data comprises a series of operation vectors, which are generated corresponding to user's each operation on the credit business system. In some embodiments, the series of operation vectors comprises one or more page operation vectors which are generated corresponding to the user's operation on the web pages linking to the credit business system, and one or more button operation vectors which are generated corresponding to the user's operation on the buttons in the web pages.

In one aspect, performing risk identification on the user using a neuronal network according to the loan request and the operation data to generate a result comprises: generating a final representation vector representing the series of operation vectors. In some embodiments, generating a final representation vector representing the series of operation vectors comprises: dividing the series of operation vectors into one or more sessions of operation vectors, performing length normalization on each session of operation vectors using an attention model to generate a representation vector of each session with a fixed length. In some embodiments, the series of operation vectors are divided into one or more sessions according to operation time or operation interval. In some embodiments, generating a final representation vector representing the series of operation vectors further comprises: applying one or more gating functions to filter the representation vectors of the one or more sessions to obtain one or more filtered vectors. In some embodiments, vectors reflecting a time period are further inputted to the one or more gating functions for assisting in filtering the representation vectors of the one or more sessions. In some embodiments, generating a final representation vector representing the series of operation vectors further comprises: applying a GRU model which is a sequence information processing model to the one or more filtered vectors to obtain a final representation of the one or more filtered vectors.

In another aspect, performing risk identification on the user using a neuronal network according to the loan request and the operation data to generate a result further comprises: obtaining one or more portrait vectors representing one or more portraits of the user, and/or one or more information vectors representing the relevant information of the operation on the credit business system by the user; inputting the final representation vector, the one or more portrait vectors, and/or the one or more information vectors into a multilayer perceptron; and generating a result of the risk identification by performing a cross-entropy loss function to the output of the multilayer perceptron.

Embodiments disclosed herein further provide a credit business system for credit risk identification, comprising: a receiving unit configured to receive a loan request to a credit business system from a user; an obtaining unit configured to obtaining, in response to the loan request, operation data by the user on the credit business system within a period of time before the loan request; a model training unit configured to perform risk identification on the user using a neuronal network according to the loan request and the operation data to generate a result; a determining unit configured to determine a response to the loan request based on the result of the risk identification. In some embodiments, the operation data comprises a series of operation vectors, which are generated corresponding to user's each operation on the credit business system. In some embodiments, the series of operation vectors comprises one or more page operation vectors which are generated corresponding to the user's operation on the web pages linking to the credit business system, and one or more button operation vectors which are generated corresponding to the user's operation on the buttons in the web pages.

In one aspect, the model training unit further comprises a first subunit, configured to generate a final representation vector representing the series of operation vectors. In some embodiments, the first subunit is configured to divide the series of operation vectors into one or more sessions of operation vectors, and perform length normalization on each session of operation vectors using an attention model to generate a representation vector of each session with a fixed length. In some embodiments, the series of operation vectors are divided into one or more sessions according to operation time or operation interval. In some embodiments, the first subunit is further configured to apply one or more gating functions to filter the representation vectors of the one or more sessions to obtain one or more filtered vectors. In some embodiments, vectors reflecting a time period are further inputted to the one or more gating functions for assisting in filtering the representation vectors of the one or more sessions. In some embodiments, the first subunit is further configured to apply a GRU model which is a sequence information processing model to the one or more filtered vectors to obtain a final representation of the one or more filtered vectors.

In another aspect, the model training unit further comprises: a second subunit, configured to obtain one or more portrait vectors representing one or more portraits of the user, and/or one or more information vectors representing the relevant information of the operation on the credit business system by the user; a third subunit, configured to input the final representation vector, the one or more portrait vectors, and/or the one or more information vectors into a multilayer perceptron; and a fourth subunit, configured to generate a result of the risk identification by performing a cross-entropy loss function to the output of the multilayer perceptron.

It shall be understood that different aspects of the disclosure can be appreciated individually, collectively, or in combination with each other. Various aspects of the disclosure described herein may be applied to any of the particular applications set forth below. Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
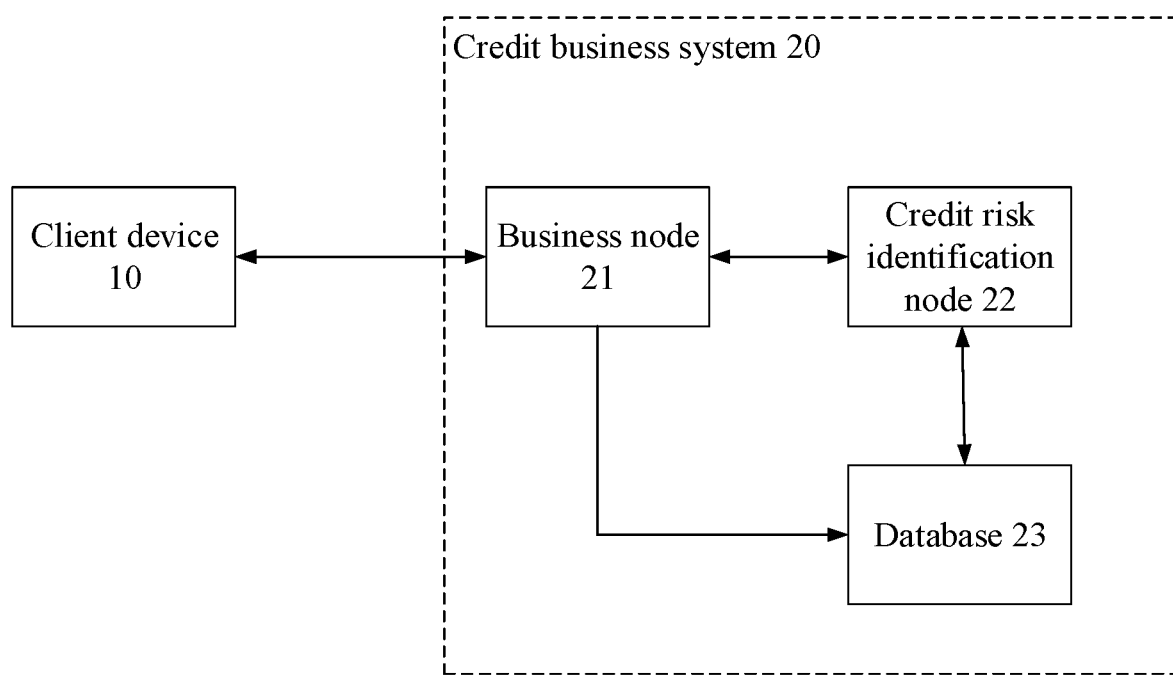
FIG. 1 provides a block diagram illustrating a system environment for determining a response to a loan request via credit risk identification consistent with disclosed embodiments.

FIG. 1 provides a block diagram illustrating a system environment for determining a response to a loan request via credit risk identification consistent with disclosed embodiments. As illustrated in FIG. 1, the environment 100 includes a client device 10 and a credit business system 20. In one embodiment, the credit business system 20 can comprise a business node 21, a credit risk identification node 22, and a database 23. The business node 21 is configured to communicate with the client device 20. For example, the client device 10 can send business requests to the business node 21, and the business node 21 can send responses to the business requests. The credit risk identification node 22 can perform risk identification on users in response to requests from the business node 21, and save relevant data in the database 23.

The client device 10 and the credit business system 20 may be in network communication across the system environment 100 through a network. The network may include a local area network (LAN), a wide area network (WAN), and/or a global area network (GAN). The network may provide for wireline, wireless, or a combination of wireline and wireless communication between devices in the network. In one embodiment, the network includes the Internet.

The client device 10 may be a personal computer, a personal digital assistant, or a mobile phone that includes web browsing functionality or credit application. The credit business system 20 may be any system owned or otherwise controlled by a financial institution, such as a bank.

Figure 2:
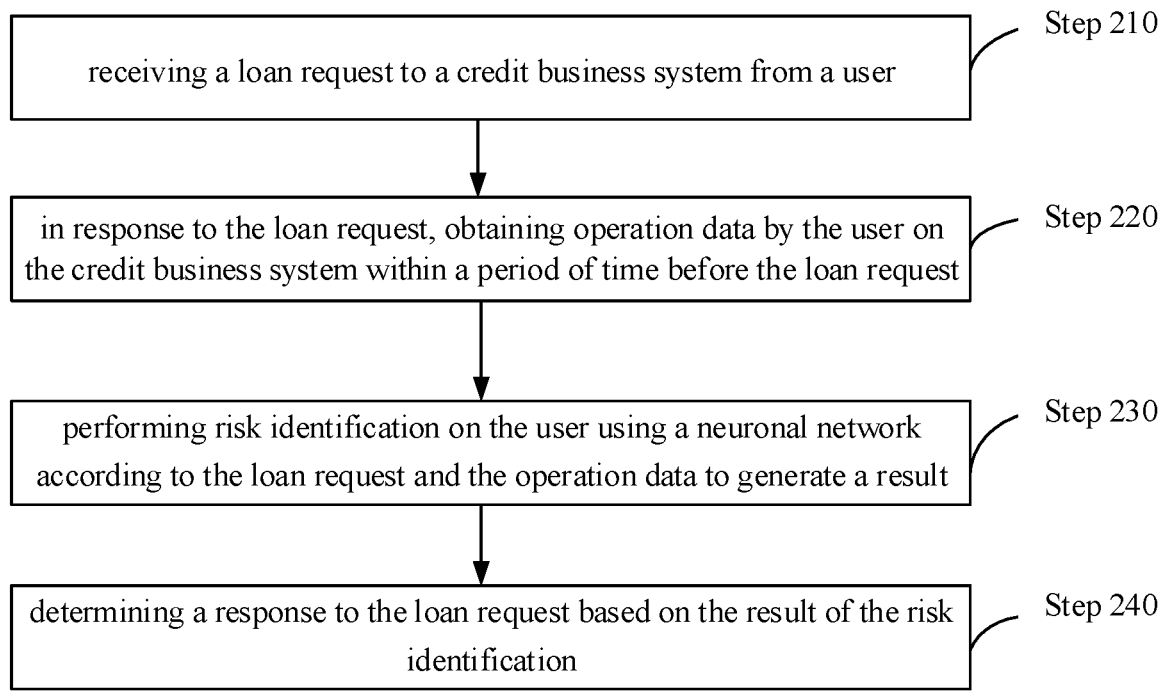
FIG. 2 provides a flowcharts of an exemplary process for credit risk identification consistent with disclosed embodiments.

FIG. 2 provides a flowcharts of an exemplary process for credit risk identification consistent with disclosed embodiments. In one embodiment, the process may be performed by the credit business system 20. The credit business system 20 may be configured to generate one or more interfaces that enable a user to browse details of one or more credit products that may be presented via client device 10. The credit business system 20 may provide options in the form of menus, hyperlink selections, user-provided representations, etc.

A user who is seeking a mortgage from the credit business system 20 may log in to the credit business system 20 through web browsing or the credit application in the client device 10 to perform some operations on credit business, including browsing various credit products. The user may click in pages to view the details of the credit products that he is interested in, and may fill in the required information. The user can send a loan request to the credit business system 20 by clicking a apply button in one page of one credit product.

Referring to FIG. 2, the credit business system 20 receives the loan request from the user (step 210). The credit business system 20 is configured to identify the credit risk of the user, and determine whether to issue a loan to the user based on the credit risk of the user. In one embodiment, the credit risk of the user can be determined based on the feature extraction of user operation behavior on the client device. In response to the loan request, the credit business system 20 obtain operation data by the user relating to the credit business system within a period of time before the loan request (step 220). The length of the period of time can be days, weeks, or months. For example, the period of time can be two weeks before the loan request. The length of the period of time can be different corresponding to different types of loan requests.

In one embodiment, the credit business system 20 can perform risk identification on the user using a neuronal network according to the loan request and the operation data to generate a result (step 230), and determine a response to the loan request based on the result of the risk identification (step 240). The result of risk identification and/or the operation data may be further deposited in the database 40 as future training data.

In one embodiment, the operation data comprises a series of operation vectors, which are generated corresponding to user's each operation on the web pages or application connecting to the credit business system 20. In one embodiment, the operation data comprises one or more page operation vectors and button operation vectors. One page operation vector can be generated based on log information on an operation performed on one web page linking to the credit business system 20 by the user, and one button operation vector can be generated based on an operation performed on one button or one position on the web page.

Figure 3:
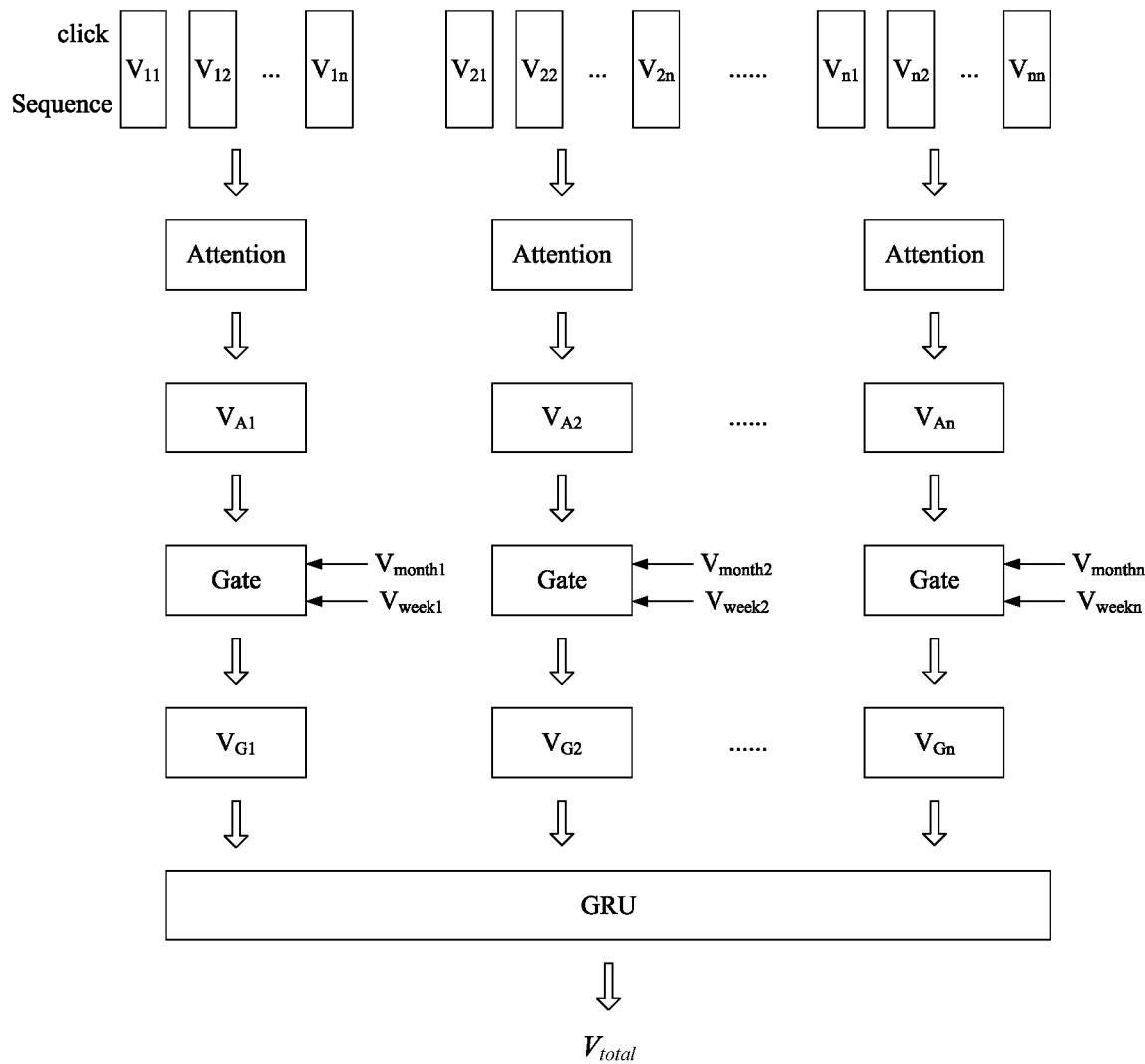
FIG. 3 provides a flowcharts of an exemplary process for generating the final representation vector representing the series of operation vectors consistent with disclosed embodiments.

In one embodiment, the neuronal network generates a final representation vector representing the series of operation vectors for calculating the risk of the user. FIG. 3 provides a flowcharts of an exemplary process for generating the final representation vector representing the series of operation vectors consistent with disclosed embodiments.

Referring to FIG. 3, the series of operation vectors within the period of time before the loan request being submitted is divided into one or more sessions of operation vectors. As is shown in FIG. 3, $V_{ij}$ denotes an operation vector in the operation data, and $V_{11}$ to $V_{1n}$ denote vectors in session 1, $V_{21}$ to $V_{2n}$ denote vectors in session 2, $V_{m1}$ to $V_{mn}$ denote vectors in session n and so forth. The number of vectors in different sessions can be the same or can be different.

In one embodiment, the operation data can be divided according to operation time. For example, operation vectors that happen in different days can be divided into different sessions, and operation vectors that happen in the same day can be divided into the same session. For example, operation vectors that happen in every hour can be divided into a session.

In one embodiment, the operation data can be divided according to operation interval. For example, two operation vectors corresponding to two adjacent operations can be divided into a same session when the operation interval between the two adjacent operation vectors is within a preset duration, and two operation vectors corresponding to two adjacent operations can be divided into different sessions when the operation interval between the two operation vectors exceeds a preset duration.

Referring to FIG. 3, since user's behavior in different sessions are not necessarily the same, and different behaviors have different effects on the credit risk identification, in one embodiment, the one or more sessions of operation vectors can be processed through an attention model in the neuronal network. The attention model performs length normalization on each session of operation vectors to generate a representation vector of each session with a fixed length. As is shown in FIG. 3, $V_{A_1}, V_{A_2}, \ldots V_{A_n}$ refers to the representation vectors of the n sessions respectively.

In one embodiment, the network performs length normalization using the following equations.

$$\alpha_{ij} = \exp(\text{Tan } h(W^T V_{ij} + b)) / \Sigma_{k=1}^n \exp(\text{Tan } h(W^T V_{ik} + b))$$

$$V_{A_i} = \Sigma_{j=1}^n \alpha_{ij} * V_{ij}$$

Where W and b are both coefficients of the attention model and are trained with the neuronal network, and $$Tanh(x) = \frac{\exp(x) - \exp(-x)}{\exp(x) + \exp(x)}.$$

In one embodiment, W and b both denote weight coefficient of $V_{ij}$. In this way, the unified representation vectors of n sessions are obtained.

Referring to FIG. 3, in one embodiment, the neuronal network further applies one or more gating functions to filter the representation vectors of the one or more sessions to obtain one or more filtered vectors. In one embodiment, in addition to inputting the representation vectors of the one or more sessions, vectors reflecting a time period are inputted to the one or more gating functions for assisting in filtering the representation vectors of the one or more sessions. For example, vectors reflecting a time period can be vectors representing days in a week (e.g., Monday, Tuesday, Wednesday, etc.) and/or days in a month (e.g., $1^{st}$, $2^{nd}$, $3^{rd}$, $4^{th}$, etc.). As users may have a certain periodicity when applying for loans, the vectors reflecting a time period can help improve filtering representation vectors of the one or more sessions. In one embodiment, vectors reflecting a time period can be initialized randomly, and then trained together with the neutral network.

In one embodiment, the one or more gating functions include the function shown below.

$$V_{G_i} = \text{sigmoid}(W_p * [V_{A_i} : V_{month} : V_{week}] + b_p) \theta \text{ Tan } h(W_k * [V_{A_i} : V_{month} : V_{week}] + b_k)$$

Where $[V_{A_i} : V_{month} : V_{week}]$ denotes the splicing operation of the three vectors, $$Tanh(x) = \frac{\exp(x) - \exp(-x)}{\exp(x) + \exp(x)},$$

and $$\text{sigmoid }(x) = \frac{1}{1 + \exp(-x)},$$

$W_k$, $b_p$, $W_p$ and $b_k$ are parameters of the gating functions and are trained together with the neutral model. In this way, the sequence of vectors $[V_{A_1}, V_{A_2}, \ldots, V_{A_n}]$ are sequentially inputted to the one or more gating functions, and the filtered output sequence of the gate structure $[V_{G_1}, V_{G_2}, \ldots V_{G_n}]$ are obtained in turn. The filtered output sequence of the gate structure $[V_{G_1}, V_{G_2}, \ldots V_{G_n}]$ reflects the user's continuous business operation behavior characteristics and are input into the next step of the user credit risk identification process for further processing.

Referring to FIG. 3, in one embodiment, the sequence of filtered vectors is further inputted into a GRU model which is a sequence information processing model to obtain a final representation vector of the sequence of filtered vectors. In one embodiment, the GRU model is a relatively common variant of recurrent neural networks, which can contain a reset gate structure and an update gate structure to control the transmission and change of information.

The final representation vector of the sequence of filtered vectors reflects the business operation habits of the one or more sessions operated by the user on the client device. As is shown in FIG. 3, $V_{total}$ denotes to the final representation vector of the sequence of filtered vectors.

Figure 4:
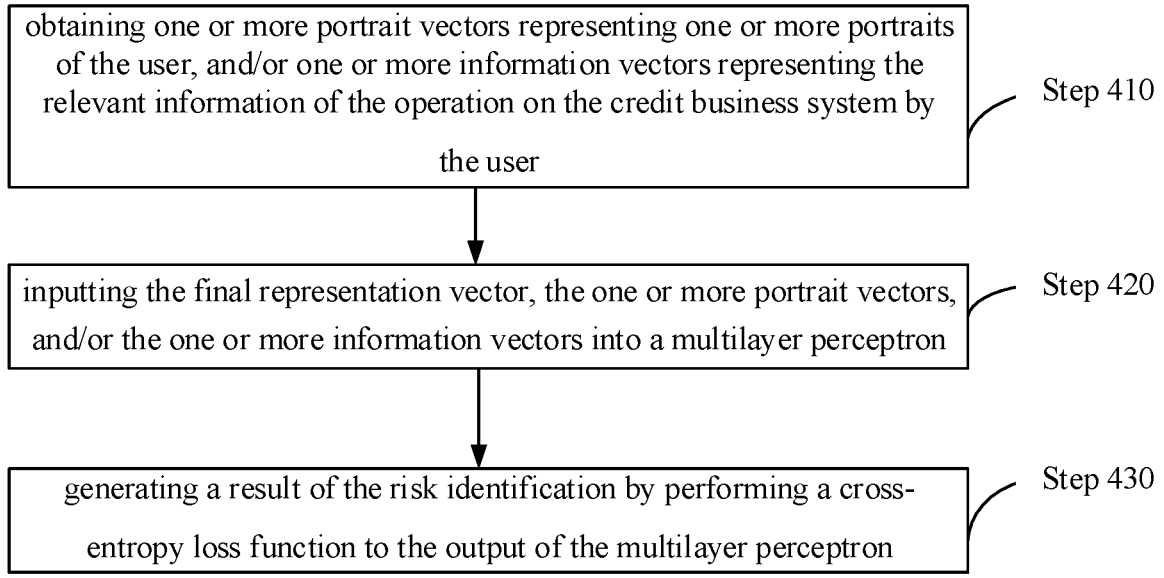
FIG. 4 provides a flowcharts of an exemplary process for performing risk identification on the user consistent with disclosed embodiments.

In one embodiment, the neuronal network applies an MLP (Multilayer perceptron) to the final representation vector to perform risk identification on the user. FIG. 4 provides a flowcharts of an exemplary process for performing risk identification on the user consistent with disclosed embodiments.

In one embodiment, more vectors related to information of the user can be input to the MLP for better determination of the risk of the user. For example, the credit business system 20 further obtaining one or more portrait vectors representing one or more portraits of the user, and/or one or more information vectors representing the relevant information of the operation on the credit business system by the user (step 401). For example, the one or more portraits of the user can comprise user's age, gender, or occupation etc. For example, the relevant information of the operation on the credit business system can comprise average residence time per page, number of pages clicked by the user before submitting the loan request, type of the credit app used by user for submitting the loan request etc.

In one embodiment, the number of layers of the MLP and the number of neurons in each layer are hyperparameters that needs to be determined according to the credit business.

Referring to FIG. 4, the credit business system 20 inputs the one or more portrait vectors and/or the one or more information vectors, along with the final representation vector, into a MLP (step 402).

The credit business system 20 generates a result of the risk identification by performing a cross-entropy loss function to the output of the MLP (step 403). The result can be a fraud identification probability. In one embodiment, the cross-entropy loss function can be a sigmoid function. The sigmoid function can comprises a function as follows:

$$L(x)=\Sigma_{i=1}^{n} y_i \log \text{sigmoid}(x_i)+(1-y_i)\log(1-\text{sigmoid}(x_i))$$

Where n denotes the number of samples.

Figure 5:
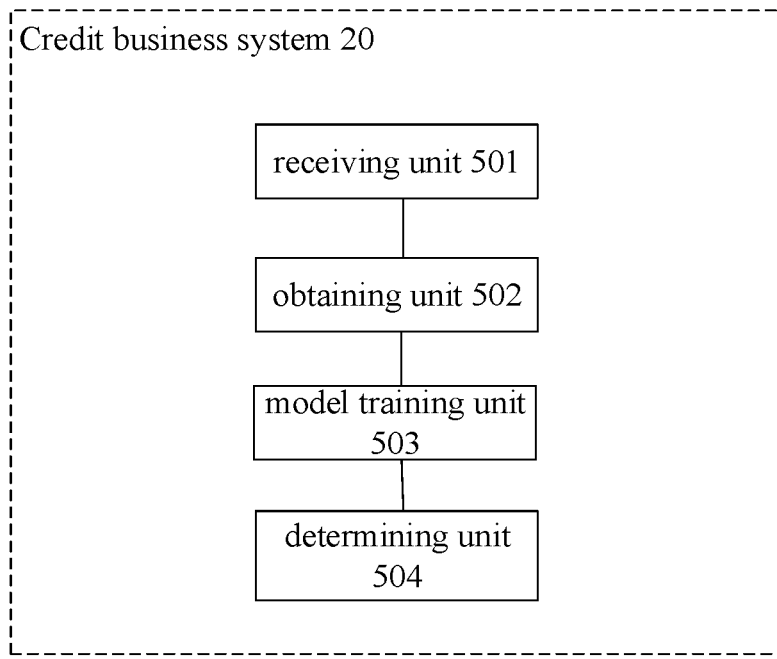
FIG. 5 provides a block diagram illustrating a logical structure of the credit business system consistent with disclosed embodiments.

FIG. 5 provides a block diagram illustrating a logical structure of the credit business system consistent with disclosed embodiments. The credit business system comprises a receiving unit 501, an obtaining unit 502, a model training unit 503, and a determining unit 504.

The receiving unit 501 is configured to receive a loan request to a credit business system from a user. The obtaining unit 502 is configured to obtaining, in response to the loan request, operation data by the user on the credit business system within a period of time before the loan request. The model training unit 503 is configured to perform risk identification on the user using a neuronal network according to the loan request and the operation data to generate a result. The determining unit 504 is configured to determine a response to the loan request based on the result of the risk identification.

In some embodiments, the operation data comprises a series of operation vectors, which are generated corresponding to user's each operation on the credit business system. In some embodiments, the series of operation vectors comprises one or more page operation vectors which are generated corresponding to the user's operation on the web pages linking to the credit business system, and one or more button operation vectors which are generated corresponding to the user's operation on the buttons in the web pages.

In some embodiments, the model training unit 503 further comprises a first subunit, configured to generate a final representation vector representing the series of operation vectors. In some embodiments, the first subunit is configured to divide the series of operation vectors into one or more sessions of operation vectors, and perform length normalization on each session of operation vectors using an attention model to generate a representation vector of each session with a fixed length. In some embodiments, the series of operation vectors are divided into one or more sessions according to operation time or operation interval. In some embodiments, the first subunit is further configured to apply one or more gating functions to filter the representation vectors of the one or more sessions to obtain one or more filtered vectors. In some embodiments, vectors reflecting a time period are further inputted to the one or more gating functions for assisting in filtering the representation vectors of the one or more sessions. In some embodiments, the first subunit is further configured to apply a GRU model which is a sequence information processing model to the one or more filtered vectors to obtain a final representation of the one or more filtered vectors.

In some embodiments, the model training unit further 504 comprises: a second subunit configured to obtain one or more portrait vectors representing one or more portraits of the user, and/or one or more information vectors representing the relevant information of the operation on the credit business system by the user; a third subunit configured to input the final representation vector, the one or more portrait vectors, and/or the one or more information vectors into a multilayer perceptron; and a fourth subunit configured to generate a result of the risk identification by performing a cross-entropy loss function to the output of the multilayer perceptron.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method for credit risk identification, the method comprising:

receiving, by a Web graphical user interface (GUI), said GUI linked to a credit business system, user activity accessing the credit business system from a plurality of users, and continuously storing, in a database associated with the credit business system, operation data of each user of the credit business system over a preceding period of time comprising at least one day, said operation data comprising at least one interaction between each user and the GUI, said operation data comprising a series of operation vectors which are generated corresponding to each operation of each user on the credit business system;

receiving a loan request to the credit business system from a user;

in response to the loan request, accessing the database and obtaining operation data associated specifically with the user and relating to the user's activity on the credit business system, said activity including the at least one interaction between the user and the GUI, within the preceding period of time before the loan request;

performing risk identification on the user using a neuronal network according to the loan request and the operation data to generate a result, comprising:

generating a final representation vector representing the series of operation vectors;

obtaining one or more portrait vectors representing one or more portraits of the user, and/or one or more information vectors representing the relevant information of the operation on the credit business system by the user; inputting the final representation vector, the one or more portrait vectors, and/or the one or more information vectors into a multilayer perceptron; and generating a result of the risk identification by performing a cross-entropy loss function to the output of the multilayer perceptron; and determining a response to the loan request based on the result of the risk identification.

2. The method of claim 1, wherein the series of operation vectors comprises one or more page operation vectors which are generated corresponding to the user's operation on the web pages linking to the credit business system, and one or more button operation vectors which are generated corresponding to the user's operation on the buttons in the web pages.

3. The method of claim 1, wherein generating a final representation vector representing the series of operation vectors comprises:

dividing the series of operation vectors into one or more sessions of operation vectors; and performing length normalization on each session of operation vectors using an attention model to generate a representation vector of each session with a fixed length.

4. The method of claim 3, wherein the series of operation vectors are divided into one or more sessions according to operation time or operation interval.

5. The method of claim 3, wherein generating a final representation vector representing the series of operation vectors further comprises:

applying one or more gating functions to filter the representation vectors of the one or more sessions to obtain one or more filtered vectors.

6. The method of claim 5, wherein vectors reflecting a time period are further inputted to the one or more gating functions for assisting in filtering the representation vectors of the one or more sessions.

7. The method of claim 5, wherein generating a final representation vector representing the series of operation vectors further comprises:

applying a GRU model which is a sequence information processing model to the one or more filtered vectors to obtain a final representation of the one or more filtered vectors.

8. A credit business system, comprising:
a Web graphical user interface (GUI) linked to the credit business system configured to receive user activity accessing the credit business system from a plurality of users;
a database associated with the credit business system and configured to continuously store operation data of each user of the credit business system over a preceding period of time comprising at least one day, said operation data comprising at least one interaction between each user and the GUI, said operation data comprising a series of operation vectors which are generated corresponding to each operation of each user on the credit business system;
a receiving unit configured to receive a loan request to the credit business system from a user;
an obtaining unit configured to, in response to the loan request, access the database and obtain operation data associated specifically with the user and relating to the user's activity on the credit business system, said activity including the at least one interaction between the user and the GUI, within the preceding period of time before the loan request;
a model training unit configured to perform risk identification on the user using a neuronal network according to the loan request and the operation data to generate a result, comprising:

a first subunit configured to generate a final representation vector representing the series of operation vectors;
a second subunit configured to obtain one or more portrait vectors representing one or more portraits of the user, and/or one or more information vectors representing the relevant information of the operation on the credit business system by the user;
a third subunit configured to input the final representation vector, the one or more portrait vectors, and/or the one or more information vectors into a multilayer perceptron; and a fourth subunit configured to generate a result of the risk identification by performing a cross-entropy loss function to the output of the multilayer perceptron; and a determining unit configured to determine a response to the loan request based on the result of the risk identification.

9. The system of claim 8, wherein the series of operation vectors comprises one or more page operation vectors which are generated corresponding to the user's operation on the web pages linking to the credit business system, and one or more button operation vectors which are generated corresponding to the user's operation on the buttons in the web pages.

10. The system of claim 8, wherein the first subunit is configured to:
divide the series of operation vectors into one or more sessions of operation vectors; and perform length normalization on each session of operation vectors using an attention model to generate a representation vector of each session with a fixed length.

11. The system of claim 10, wherein the series of operation vectors are divided into one or more sessions according to operation time or operation interval.

12. The system of claim 10, wherein the first subunit is further configured to apply one or more gating functions to filter the representation vectors of the one or more sessions to obtain one or more filtered vectors.

13. The system of claim 12, wherein vectors reflecting a time period are further inputted to the one or more gating functions for assisting in filtering the representation vectors of the one or more sessions.

14. The system of claim 12, wherein the first subunit is further configured to apply a GRU model which is a sequence information processing model to the one or more filtered vectors to obtain a final representation of the one or more filtered vectors.

\* \* \* \* \*